C. B. BAUMGARTNER.
SEED CORN GRADER.
APPLICATION FILED OCT. 20, 1916.

1,250,768.

Patented Dec. 18, 1917.
2 SHEETS—SHEET 1.

Inventor,
C. B. Baumgartner, by
G. C. Kennedy
Attorney.

C. B. BAUMGARTNER.
SEED CORN GRADER.
APPLICATION FILED OCT. 20, 1916.

1,250,768.

Patented Dec. 18, 1917.

Inventor,
C. B. Baumgartner, by
G. C. Kennedy,
Attorney.

UNITED STATES PATENT OFFICE.

CHARLES B. BAUMGARTNER, OF MANCHESTER, IOWA, ASSIGNOR TO CHARLES HUNNICUTT, OF WILMINGTON, OHIO.

SEED-CORN GRADER.

1,250,768.  Specification of Letters Patent.  Patented Dec. 18, 1917.

Application filed October 20, 1916. Serial No. 126,721.

*To all whom it may concern:*

Be it known that I, CHARLES B. BAUMGARTNER, a citizen of the United States of America, and a resident of Manchester, Delaware county, Iowa, have invented certain new and useful Improvements in Seed-Corn Graders, of which the following is a specification.

My invention relates to improvements in seed-corn graders, and the object of my improvement is to supply a device provided with various means for separating varying sizes of corn kernels, to eliminate imperfect kernels from those suitable to be used for seed.

Figure 2:
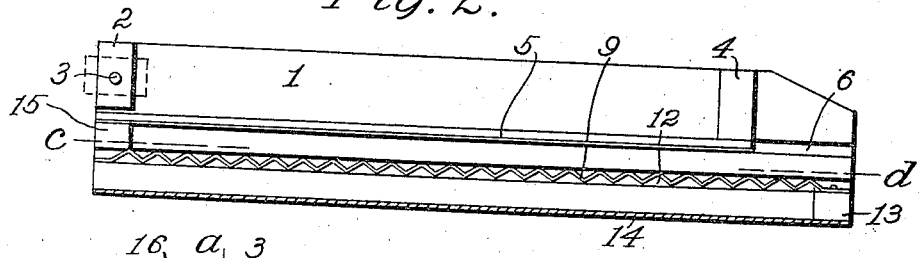
Figure 4:
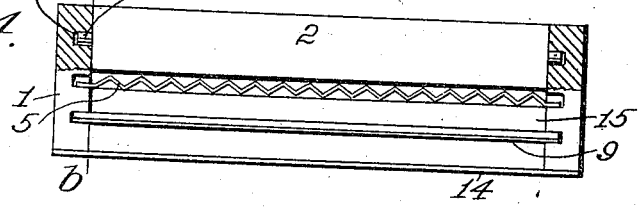
Figure 3:
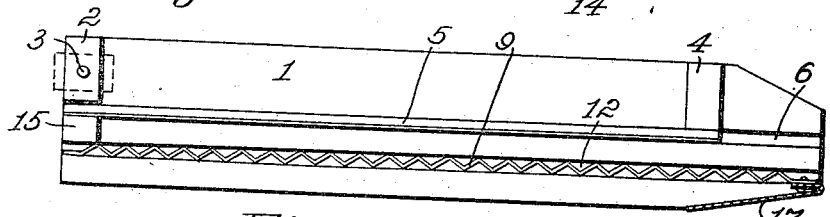
Figure 1:
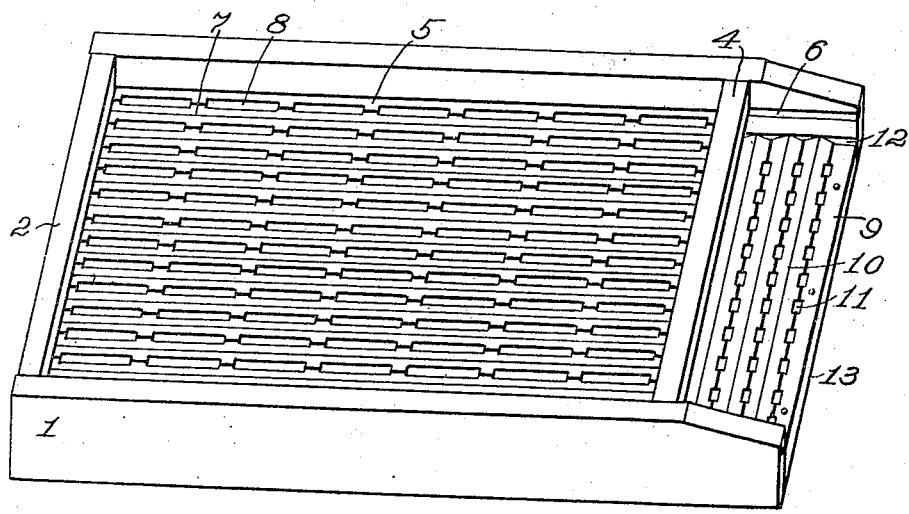
Figure 5:
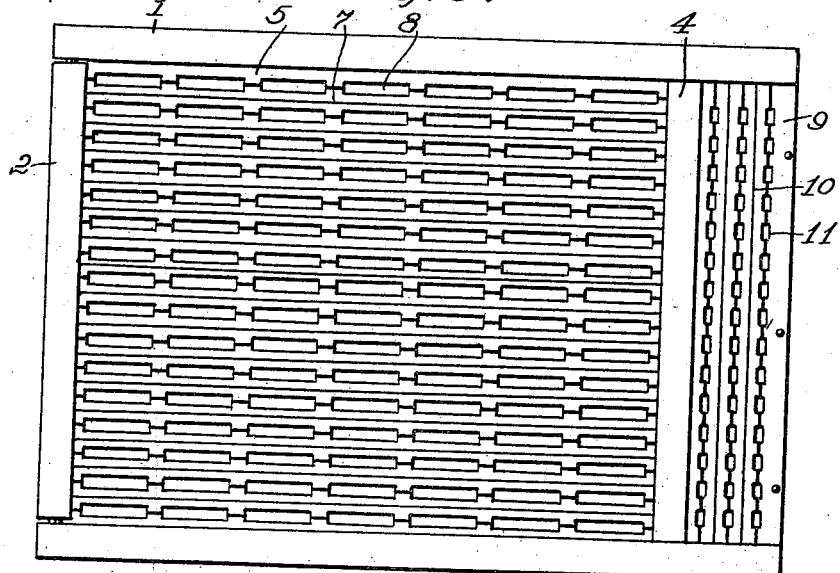
Figure 6:
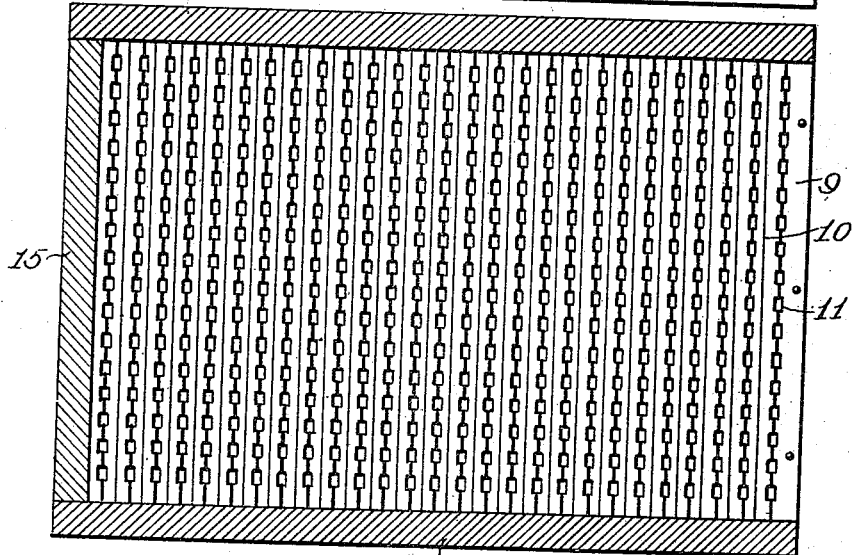

This object I have accomplished by the means which are hereinafter described and claimed, and which are illustrated in the accompanying drawings, in which Figure 1 is an isometric perspective view of my improved seed-corn grader; Fig. 2 is a vertical longitudinal section of the device taken on the line $a$—$b$ of Fig. 4; Fig. 3 is a similar view of a modified device; Fig. 4 is an elevation of one end of the grader, with parts broken away; Fig. 5 is a top plan view thereof, and Fig. 6 is a horizontal section thereof taken on the line $c$—$d$ of said Fig. 2.

Similar numerals of reference denote similar parts throughout the several views.

The frame of my improved seed-corn grader is composed of sides 1 connected rigidly by cross-bars 4, 13 and 15, and a flat bottom plate 14. The inner walls of said sides 1 are longitudinally horizontally grooved at 6 and 12 to admit therein the side edges of vertically-spaced horizontally arranged corrugated plates 5 and 9 respectively.

The upper plate 5 has a number of longitudinal corrugations 7, with each trough thereof provided with a number of elongated slots 8. The lower plate 9 has a number of transverse corrugations 10, with each trough thereof provided with a plurality of relatively short slots 11.

The cross-bar 4 stops the one end of the space over the plate 5 and between the sides 1, while the other end of said space is stopped by a cross-bar 2, which has at its ends projecting pintles 3 received pivotally in sockets 16 in the sides 1, to allow said bar 2 to rock as indicated by the dotted lines in said Figs. 2 and 3, to thereby furnish a delivery opening at that end of the plate 5 when required.

The space between the plates 5 and 9 is permanently stopped at its end under the rock-bar 2, by means of the fixed cross-bar 15, the other end of said space being open. The end of the lowest interspace of the plate 9 and the bottom-plate 14 is open under the left-hand end of the grader, and closed at its other end by the fixed cross-bar 13.

In Fig. 3 is shown a modification of the device, wherein the bottom-plate 14 is removed, and the sloping cross-plate 17 substituted, the plate 17 underlying only a portion of the plate 9 at that end of the grader.

The cross-bar 4 is spaced a distance from the right-hand end of the grader, but may be otherwise located as desired.

A quantity of seed-corn kernels is placed upon the uppermost corrugated plate 5, and the grader manually shaken to and fro horizontally, thus putting the kernels in motion along said plate to cause the kernels to all move over the slots 8 in the troughs between the longitudinal corrugations 7. Those kernels which are too thick to be suitable for use in distribution by the dropping mechanism of a corn-planter, are retained by said plate, being unable to pass through the slots 8, while all other kernels drop through said slots upon the transversely corrugated plate 9. Continued shaking of the grader causes the small and insufficiently developed kernels which have passed the slots 8 to also pass through the slots 11 to drop upon the bottom plate 14, or in case the bottom plate 14 is not used, as in the modified grader, shown in Fig. 3, the small kernels will pass the slots 11 and drop underneath the grader into a receptacle provided for them. Otherwise, these small kernels pass off from the bottom plate 14 at its open end to be received in such a receptacle.

The perfectly formed kernels received on the plate 9, pass off therefrom to the right and drop into another receptacle placed therefor. When the separation has been fully accomplished, the cross-bar 2 may be rocked, thus opening the left-hand end of the grader at that place to permit the excessively large kernels to be shaken or dumped from the upper plate 5, without any necessity for inverting the grader, as necessary in a grader not provided with such a rock-bar end.

The longitudinal arrangement of the corrugations 7 on the upper plate 5, facilitates the first separation of the largest kernels from the mass placed thereon, but the transverse corrugations 10 of the lower plate 9 hold back the separation until the smallest kernels can work through the slots 11.

It will be observed that the orificed lower plate 9 is extended at its delivery end for a distance beyond the upper separating plate 5, the extended part containing the orifices 11 and transverse corrugations 10, so that the separation of the kernels may be prolonged along said plate to its end to more completely separate the smaller imperfect kernels.

Having described my invention, what I claim as new, and desire to secure by Letters Patent, is:

1. A seed-corn grader, comprising a frame, spaced superposed screens mounted in said frame, the upper screen positioned below the upper edges of the frame to form a receptacle closed all around, the lower screen positioned above the lower edges of the frame, the interspace of the screens open only at one end, and a bottom plate closing the lower end of the frame below the lower screen spaced from the latter to receive therefrom, the interspace between the bottom plate and said lower screen plate being open only at its end opposite the open end of the interspace of said screens.

2. A seed corn-grader, comprising a frame, a screen positioned in said frame below its top, the parts of the frame thereabove forming with said screen an open top receptacle, one end part of the frame above the screen being movably connected thereto to open away from the screen, another screen positioned in the frame below said screen, spaced therefrom and inclosed all around by the frame except at one open end, and an imperforate plate mounted across the lower part of the frame, closed thereagainst at one end and spaced from and positioned underneath the lower screen.

3. A seed-corn grader, comprising a frame, a screen positioned in said frame, another and transversely corrugated screen positioned in said frame below the first-mentioned screen and having its delivery-end extended for a distance beyond the adjacent end of the latter, the lower screen having orifices in the depressions of the corrugations therein and also distributed evenly over the whole surface of its said extended delivery-end.

Signed at Manchester, Iowa, this 16 day of Oct. 1916.

CHARLES B. BAUMGARTNER.

Witnesses:
C. O. DUTTON,
JOHN R. WOOD.

Copies of this patent may be obtained for five cents each, by addressing the "Commissioner of Patents, Washington, D. C."